United States Statutory Invention Registration [19]

[11] Reg. Number: H717

Stephens et al. [43] Published: Dec. 5, 1989

[54] HIGH BURN RATE AMMONIUM PERCHLORATE PROPELLANT

[75] Inventors: William D. Stephens, Huntsville; Larry C. Warren, Madison, both of Ala.

[73] Assignee: The United States of America as represented by the Secretary of the Army, Washington, D.C.

[21] Appl. No.: 243,539

[22] Filed: Sep. 12, 1988

[51] Int. Cl.[4] ..... C06B 45/10

[52] U.S. Cl. ..... 149/19.2; 149/19.4; 149/19.9; 149/113; 149/20

*Primary Examiner*—John F. Terapane
*Assistant Examiner*—Richard Treanor
*Attorney, Agent, or Firm*—Freddie M. Bush; James T. Deaton

[57] ABSTRACT

A solid propellant composition employing 2,2-bis(t-butyldicyclopentadienyliron)propane (TBD) as the burn rate enhancer in a weight percent from about 2 to about 6 weight percent yields higher threshold values for ignition by impact and improved friction and spark testing values to thereby render the solid propellant composition less hazardous to personnel during handling as compared to similar solid propellant compositions containing Catocene, (2,2-bis(ethyldicylopentadienyliron)propane). The TBD solid propellant composition also comprises from about 9 to about 10 weight percent of hydroxyterminated polybutadiene binder system including an isocyanate curative added in amount of up to 1.0 weight percent and optional modifiers in small amounts with adjustment of the weight percent of other ingredients. Other propellant ingredients comprise a trimodal mix of 200, 1.7, and 0.7 micron particle sizes of ammonium perchlorate oxidizer in amounts from about 66 to about 70 weight percent, and aluminum metal powder in amounts from about 18 to about 20 weight percent. TBD is synthesized to contain no alpha hydrogens, i.e., does not have hydrogens on carbon adjacent to the aromatic ring structure which contributes to long term oxidation and migration problems of Hycat 6D and Catocene.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH BURN RATE AMMONIUM PERCHLORATE PROPELLANT

DEDICATORY CLAUSE

The invention described herein may be manufactured, used, and licensed by or for the Government for governmental purposes without the payment to us of any royalties thereon.

BACKGROUND OF THE INVENTION

In line with the Army's continuing efforts to minimize hazards associated with propellant formulations used in its missile systems, a replacement propellant formulation has been sought that reduces some of the hazards associated with ammonium perchlorate propellants that use certain modifiers or additives such as 2,2-bis(ethyldicyclopentadienyliron)propane (also known as the trademark material Catocene) to enhance or increase propellant burn rate. Iron-containing compounds are now the current choice as burn rate enhancers for ammonium perchlorate propellants. Of these iron-containing compounds, ferrocene and its derivatives are the most efficient.

Earlier work with propellants containing solid iron compounds gave inconsistent burn rate enhancement because of the difficulty of getting a homogeneous mixture. Thereafter, liquid iron compounds were sought since it was believed that liquids would be better for mixing purposes. This plan of action lead to the development of bis(ethyldicyclopentadienyliron)methane, registered under Trademark Hycat 6D. Hycat 6D migrated readily within the solid propellant producing unsatisfactory propellant properties. Hycat 6D has a total of six alpha hydrogens (hydrogen adjacent to aromatic ring). It is known that hydrogens adjacent to aromatic ring systems are susceptible to oxidation to form acids and/or hydroperoxides. Hydroperoxides are known to be highly unstable compounds.

Since the alpha hydrogens were believed to be the reason for long term oxidation problems, Catocene was developed by coupling two ethylferrocenes with acetone, thus replacing the two bridged hydrogens with two methyl groups. Catocene then became the choice as a burn rate accelerator for ammonium perchlorate-based propellants. By replacing the two bridged hydrogens with methyl groups, long term oxidation and migration problems were reduced. However, accidental ignitions of solid propellants containing Catocene have occurred in both freshly prepared and aged propellants.

Therefore, the current status of Catocene in light of the concern for safety, where accidental ignition has been a problem for both freshly prepared and aged propellants, has motivated the development of a dicyclopentadienyliron compound that performs at the level of Catocene while having improved safety characteristics.

Therefore, an object of this invention is to provide a solid propellant composition which employs a dicyclopentadienyliron compound as a burn rate enhancer while retaining improved safety characteristics for the propellant formulation as compared with Catocene employed in a similar propellant formulation.

SUMMARY OF THE INVENTION

The solid propellant formulation of this invention employing 2,2-bis(t-butyldicylopentadienyliron)propane (TBD) as the burn rate enhancer yields higher threshold values for ignition by impact and improved friction and spark testing values to thereby render the solid propellant formulation less hazardous to personnel during handling. TBD solid propellant formulations also give improved results of the desired pressure exponent, potlife, and maximum stress characteristics when compared to similar solid propellant formulation containing Catocene.

The improved solid propellant composition having the properties described above is comprised of TBD as a burn rate enhancer in amounts from about 2 to about 6 weight percent, of about 68 weight percent of ammonium perchlorate of a trimodel blend of 200, 1.7, and 0.7 micron particle size, of aluminum powder of about 18 weight percent of a burner of hydroxyterminated polybutadience of about 9 weight percent, of an isocyanate curing agent as an additive of about 1 weight percent, and solid propellant processing aids in trace amounts.

DESCRIPTION OF THE PREFERRED EMBODIMENT

The solid propellant composition set forth below under Example illustrates the use of TBD as a burning rate enhancer with the formulation ingredients in weight percent.

EXAMPLE

| INGREDIENT | WEIGHT PERCENT | WEIGHT PERCENT RANGE |
|---|---|---|
| Binder[1,4] | 9.0 | 9–10 |
| TBD[2] | 5.0 | 2–6 |
| Aluminum powder | 18.0 | 18–20 |
| Ammonium Perchlorate[3] | 68.0 | 66–70 |

Notes:
[1]Hydroxyterminated Polybutadiene (HTPB) binder system including an isocyanate curative as an additive up to about 1 weight percent.
[2]TBD concentration can be varied from 2–6% to give the desired burn rate.
[3]The ammonium perchlorate is a trimodal mix of particle sizes 200, 1.7, and 0.7 microns.
[4]Other additives, isocyanate curatives and modifiers can be added in small quantities with adjustment of the percent of content of other ingredients as required for desired performance.

This formulation in above Example is mixed, cast, and cured by techniques and methods that are commonly used in the industry and that are known by personnel skilled in the art of propellant formulations.

The use of this solid propellant formulation is applicable to any program where there is a need for high burn rates and improved safety characteristics.

The structural formulae (A and B) of Hycat 6D, and Catocene, respectively, are presented below for comparison with TBD; the structural formula (C) for TBD is also presented below. Hycat 6D was a good burn rate enhancer, but was susceptible to long term oxidation. Hycat 6D also yielded poor results with respect to migration properties. Hycat 6D has a total of six alpha hydrogens (hydrogen adjacent to aromatic ring). It is believed that hydrogens adjacent to aromatic ring systems are suscepticle to oxidation to form acids and/or hydroperoxides. Hydroperoxides are known to be highly unstable compounds.

Catocene was the next compound developed which showed early promise of meeting the burn rate enhancer requirement; however, it too had problems related to stability in spite of replacing two bridged hydrogens with two methyl groups as discussed below.

Since the alpha hydrogens were believed to be the reason for long term oxidation problems, Catocene was developed by coupling two ethyferrocenes with acetone, thus replacing the two bridged hydrogens with two methyl groups. Catocene became a choice as a burn rate accelerator for ammonium perchlorate-based propellants. By replacing the two bridged hydrogens with methyl groups, long term oxidation and migration problems were reduced. However, accidental ignitions of propellants containing Catocene have occurred in both freshly prepared and aged propellants. Hence, the need for TBD was established.

The purpose of the work relating to TBD is to synthesize a compound that has no alpha hydrogens. TBD does not have hydrogens on carbon adjacent to the aromatic ring structure; therefore, long term oxidation and reduced problem of migration are among the benefits derived. TBD was synthesized and a propellant mix was evaluated and compared to a similar mix containing Catocene.

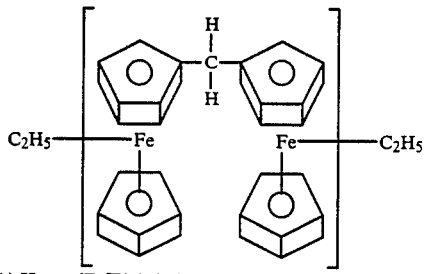

(A) Hycat 6D [Bis(ethyldicyclopentadienyliron)methane]

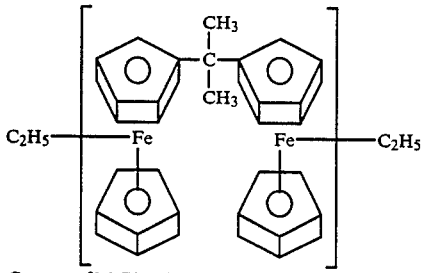

(B) Catocene [2,2-Bis(ethyldicyclopentadienyliron)propane]

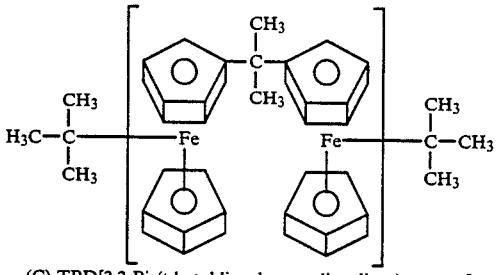

(C) TBD[2,2-Bis(t-butyldicyclopentadienyliron)propane]

EVALUATION OF TBD IN PROPELLANT FORMULATIONS

During the development program for TBD in solid propellants, several areas of interest were evaluated to determine the properties of a solid propellant composition containing TBD as compared to one containing Catocene.

The areas of interest evaluated are summarized in Table I. Sensitivity Results; Table II. One-Gallon Mix Data; and Table III. Pint Mix Preliminary Ballistic Data as follows:

TABLE I

SENSITIVITY RESULTS

| Mix No. | Percent Catalyst | Cured Sensitivity Impact (lb-cm) | Spark (joules) | Friction (lb) |
|---|---|---|---|---|
| 27 (TBD) | 6 | 78 | 0.125 | 60 |
| 29 (TBD) | 5 | 66 | 2.25 | 60 |
| 30 (TBD) | 5 | 60 | 1.00 | 50 |
| 31 (TBD) | 5 | 72 | 4.00 | 90 |
| 32 (TBD) | 0 | 74 | 25 | 90 |
| 49 (TBD) | 6 | 78 | 1.00 | ND |
| 1-gallon (TBD) | 5 | 74 | 6.25 | 80 |
| Catocene Mix | 5 | 48 | 1.00 | 50 |

TABLE II

ONE-GALLON MIX DATA

| Catalyst (%) | TBD 5% | Catocene 5% |
|---|---|---|
| EOM Viscosity, KP | 3 | 4 |
| Potlife to 40 Kp, Hr | 16.4 | 14 |
| NCO/OH | 0.89 | 0.89 |
| Maximum Stress, psi | 423 | 251 |
| Strain at Max. Stress, percent | 28 | 35 |
| Tangent Modulus | 1893 | 812 |
| Burn Rate @ 1000 psi | 3.12 | 3.19 |
| @ 2000 psi | 4.20 | 4.33 |
| Pressure Exponent | 0.43 | 0.46 |

TABLE III

PINT MIX PRELIMINARY BALLISTIC DATA

| Mix No. | % TBD | Burn Rate @ 1000 (psi) | 2000 (psi) | Pressure Exponent |
|---|---|---|---|---|
| 27 | 6 | 2.95 | 3.98 | 0.44 |
| 29 | 5 | 3.22 | 4.33 | 0.43 |
| 30 | 5 | 3.20 | 4.25 | 0.42 |
| 31 | 5 | 3.20 | 4.25 | 0.42 |
| 32 | 0 | 0.46 | 0.98 | 0.72 (1.00 @ 2000 psi) |
| 49 | 6 | 3.50 | 4.78 | 0.45 |

We claim:

1. A solid propellant composition comprising:

(i) a trimodal mix of particle sizes 200, 1.7, and 0.7 microns of ammonium perchlorate oxidizer in an amount from about 66 to about 70 weight percent, said trimodal mix having a major portion of said 1.7 and 0.7 micron particle sizes with the remainder of said weight percent being 200 micron particle size;

(ii) hydroxyterminated polybutadiene binder system in an amount from about 9 to about 10 weight percent, said hydroyx-terminated polybutadiene binder system including an isocyanate curative added in an amount of up to about 1.0 weight percent and optional modifiers in small amounts with adjustment of the weight of other ingredients;

(iii) aluminum metal powder from about 18 to 20 weight percent; and, (iv) a burning rate enhancer of 2,2-bis(t-butyldicylopentadienyliron)propane in amount from about 2 to about 6 weight percent.

2. The solid propellant composition of claim 1 wherein said trimodial mix of said ammonium perchlorate is present in an amount of about 68 weight percent; said hydroxyterminated polybutadiene binder system is present in amount of about 9 weight percent; said aluminum metal powder is present in an amount of about 18 weight percent; and wherein said burn rate enhancer of 2,2-bis(t-butyldicyclopentadienyliron)propane is present in an amount of about 5 weight percent.

* * * * *